United States Patent
Yoshizawa

(10) Patent No.: US 6,542,207 B1
(45) Date of Patent: Apr. 1, 2003

(54) LIQUID CRYSTAL DISPLAY

(75) Inventor: Seiji Yoshizawa, Tokyo (JP)

(73) Assignee: NEC Corporation, Tokyo (JP)

( * ) Notice: Subject to any disclaimer, the term of this patent is extended or adjusted under 35 U.S.C. 154(b) by 182 days.

(21) Appl. No.: 09/599,637

(22) Filed: Jun. 23, 2000

(30) Foreign Application Priority Data

Jun. 24, 1999 (JP) .......................................... 11-177809

(51) Int. Cl.[7] ............................................. G02F 1/1335
(52) U.S. Cl. ............................. 349/69; 349/61; 349/70; 349/71; 313/511; 313/512
(58) Field of Search .............................. 349/61, 69, 70, 349/71; 313/511, 512, 498, 500, 501, 506

(56) References Cited

FOREIGN PATENT DOCUMENTS

| JP | 63-120233 | 8/1988 |
|---|---|---|
| JP | 3-074084 | 3/1991 |
| JP | 4-324279 | 11/1992 |
| JP | 8-153405 | 6/1996 |
| JP | 8-190095 | 7/1996 |
| JP | 9-258225 | 10/1997 |
| JP | 10-189243 | 7/1998 |
| JP | 10-223368 | 8/1998 |

*Primary Examiner*—William K. Sikes
*Assistant Examiner*—Thoi V Duong
(74) *Attorney, Agent, or Firm*—Foley & Lardner

(57) ABSTRACT

Light from an EL backlight is used effectively without a condensing unit such as a lens sheet. A liquid crystal display includes a liquid crystal display panel provided with multiple openings allowing adjustable in light transference quantity and an EL backlight being an approximate size of the liquid crystal display panel and irradiating the liquid crystal display panel from the back. Concave luminous parts respectively corresponding to the openings are formed in a luminous layer of the EL backlight. Light generated in the concave luminous part is repeatedly reflected by an inner wall of the concave luminous part and then goes out along the central axis of the concave luminous part, therefore, the light has a strong directivity to the opening corresponding to the concave luminous part.

15 Claims, 9 Drawing Sheets

54; liquid crystal display panel

LIQUID CRYSTAL DISPLAY

BACKGROUND OF THE INVENTION

1. Field of the Invention

The present invention relates to a liquid crystal display with an EL (electroluminescent) backlight.

2. Description of the Related Art

FIG. 7 is a whole sectional view showing a conventional liquid crystal display. FIG. 8 is a assembly perspective view showing an EL backlight in the liquid crystal display shown in FIG. 7.

A conventional liquid crystal display 50 includes a liquid crystal display panel 54 provided with multiple openings 52 allowing adjustable light transference quantity and an EL backlight 56 being an approximate size of the liquid crystal display panel 54 and irradiating the liquid crystal display panel 54 from the back of the liquid crystal display panel 54.

The liquid crystal display panel 54 is an active matrix using a TFT (thin film transistor) or a like. The active matrix is a liquid crystal inserted between two glass plates, each of which is provided with a transference electrode, the TFT and a color filter inside and deflecting plates are provided covering outsides of the glass plates. Each of the openings 52 corresponds to one pixel. A non-opening 57 in the vicinity of the opening 52 is formed with a metal electrode, a black matrix or a like and shields light.

The EL backlight 56, as shown in FIG. 8, is structured by inserting a flat sheet in which a surface electrode (transference electrode) 58, a luminous layer 60, an insulating layer 62 and a rear face electrode 64 are laminated between a moisture-proof film 661 and a protective layer 681 and a moisture-proof film 662 and a protective layer 682. The surface electrode 58 is connected with a current collecting band 701 and a electrode lead 721, and the rear face electrode 64 is connected with a current collecting band 702 and a electrode lead 722.

The EL backlight 56 is a surface light source, therefore, it is possible to irradiate all of openings 52 directly without a light-introducing plate or a like. At each of the openings 52, a light transference quantity is adjusted in response to an image signal and then an image is displayed on the liquid crystal display with this light transference quantity adjustment.

Further, since the light from the EL backlight 56 is non-directional, the light is also irradiated equally to non-openings 57 and to the openings 52. Therefore, to use the light from the EL backlight 56 effectively, it is necessary to put a condensing unit such as a lens sheet 74 (shown in FIG. 7) between the liquid crystal display panel 54 and the EL backlight 56. The lens sheet 74 is provided with small lenses corresponding to the respective openings 52 and converges the light from the EL backlight 56 to the respective openings 52.

Each of Japanese Utility Model Application Laid-Open No. Sho63-120233 and Japanese Patent Application Laid-Open No. Hei3-74084 shows a liquid crystal displays provided with a concave and convex luminous surface of an EL backlight to improve luminance per an unit-surface-area. In this case, light from the EL backlight is also non-directional, therefore, it is also necessary to use a condensing unit such as a lens sheet to use the light of the EL backlight effectively.

However, a condensing unit such as a lens sheet prevents a liquid crystal display from reducing thickness, weight, a number or parts or a like.

SUMMARY OF THE INVENTION

In view of the above, it is an object of the present invention to provide a liquid crystal display utilizing a light from an EL backlight effectively without a condensing unit such as a lens sheet.

According to a first aspect of the present invention, there is provided a liquid crystal display including a liquid crystal display panel provided with multiple openings allowing adjustable light transference quantity; an EL backlight being an approximate size of the liquid crystal display panel and irradiating the liquid crystal display panel from back of the liquid crystal display panel; and concave luminous parts respectively corresponding to the openings in a luminous layer of the EL backlight.

Light generated in one of the concave luminous parts is repeatedly reflected by an inner wall of the concave luminous part and goes out along a central axis of the concave luminous part. An opening corresponding to this concave luminous part is positioned in a same direction as the central axis direction of the concave luminous part. Therefore, the light generated in the concave luminous part has a strong directivity to the opening corresponding to the concave luminous part. That is to say, the EL backlight operates equally to a condensing unit such as a lens sheet. Moreover, with this structure, an area of a luminous layer for one opening is larger than a case in that light is condensed from a flat luminous layer to one opening, therefore, luminance is improved.

In the foregoing, a preferable mode is one wherein each of the concave luminous parts is formed for each of the openings. Though two or more concave luminous parts may be formed for one opening; one-to-one is easier.

Also, a preferable mode is one wherein each of the concave luminous parts is formed for each of the openings and a center of each of the concave luminous parts coincides with a center of each of the openings when the liquid crystal display panel is viewed from front. With this mode, it is possible to introduce the light of the concave luminous parts to the opening most effectively.

Also, a preferable mode is one wherein a protective layer with a flat surface is filled in the concave luminous parts, and when a distance between the liquid crystal display panel and the EL backlight is defined as L, a pitch of the openings is defined as P1, a pitch of the concave luminous parts is defined as P2, a size of one of the concave luminous parts is defined as D. When an area surrounded by a peripheral edge of the concave luminous part is defined as S, $D=2\sqrt{S/\pi}$ (formula (1)) is expressed. When a critical angle to the protective layer is defined as $\theta_0$, P1=P2 and $L \leq (D+(P2-D)/2) \times \tan(90°-\theta_0)$ (formula (2)) is expressed. In this mode, it is possible to introduce the light of the concave luminous part effectively. A shape of the peripheral edge of the concave luminous part may be a circle, an ellipse, a triangle, a polygon or a like. Incidentally, a size D except for the circle is approximated by the formula (1).

Also, a preferable mode is one wherein the concave luminous parts are formed in a higher-density as luminance becomes lower and are formed in a lower-density as luminance becomes higher in the flat luminous layer of the EL backlight. In this mode, the luminance of the EL backlight becomes unity. For example, a lower luminous part is in a vicinity of the periphery of the EL backlight and an upper luminous part is in a vicinity of center thereof.

Also, a preferable mode is one wherein the concave luminous parts are formed in the higher-density as the concave luminous parts come near the periphery of the EL backlight and are formed in the lower-density as the concave luminous parts come near the center of the EL backlight in the luminous layer of the EL backlight.

Also, a preferable mode is one wherein the concave luminous parts are larger as the luminance becomes lower and are smaller as the luminance becomes higher in the luminous layer of the EL backlight.

Also, a preferable mode is one wherein the concave luminous parts are larger as the concave luminous parts come near the periphery of the EL backlight and are smaller as the concave luminous parts come near the center of the EL backlight in the luminous layer of the EL backlight.

Also, a preferable mode is one wherein the concave luminous parts are formed in the high-density or the low-destiny at a predetermined range in the luminous layer of the EL backlight.

Also, a preferable mode is one wherein the concave luminous parts are small or large at the predetermined range in the luminous layer of the EL backlight. The predetermined range may be a character, a diagram, a symbol or a like. It is possible to make the luminance of only the predetermined range high or low.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes for carrying out the present invention will be described in further detail using an embodiment with reference to the accompanying drawings.

Figure 1:
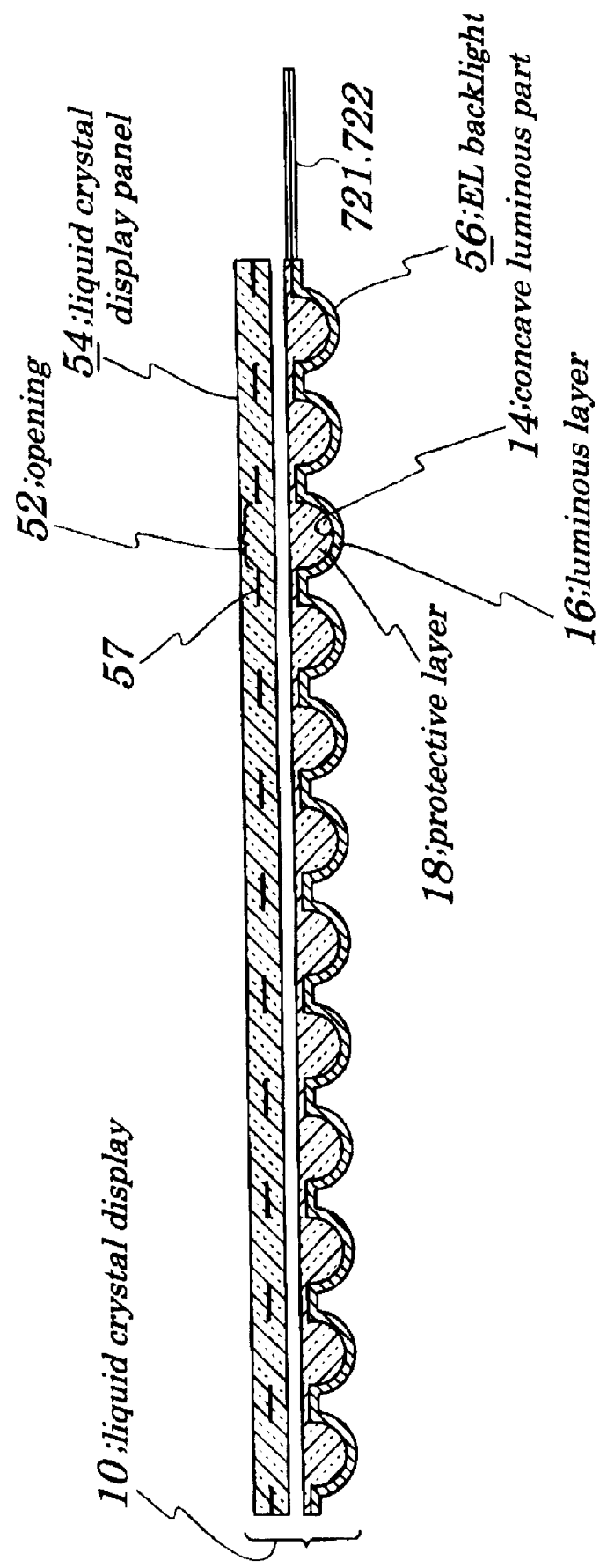
FIG. 1 is a whole sectional view showing a liquid crystal display according to an embodiment of the present invention.
Figure 2:
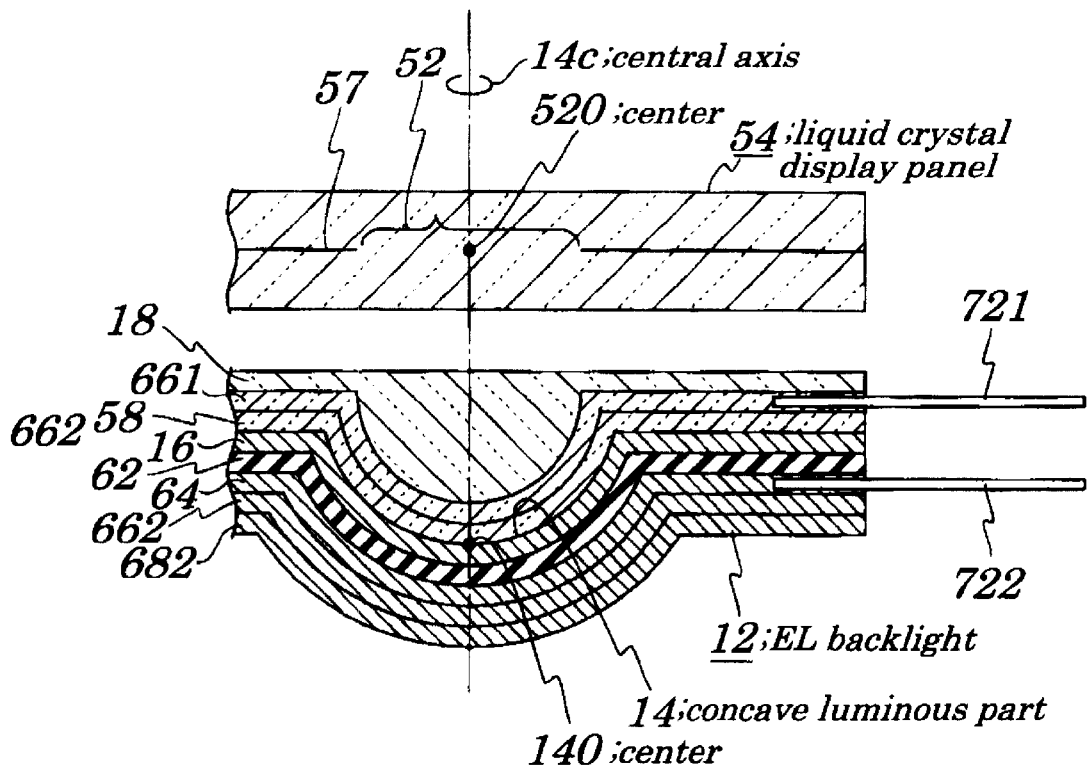
FIG. 2 is a partial enlarged sectional view of the liquid crystal display shown in FIG. 1.
Figure 7:
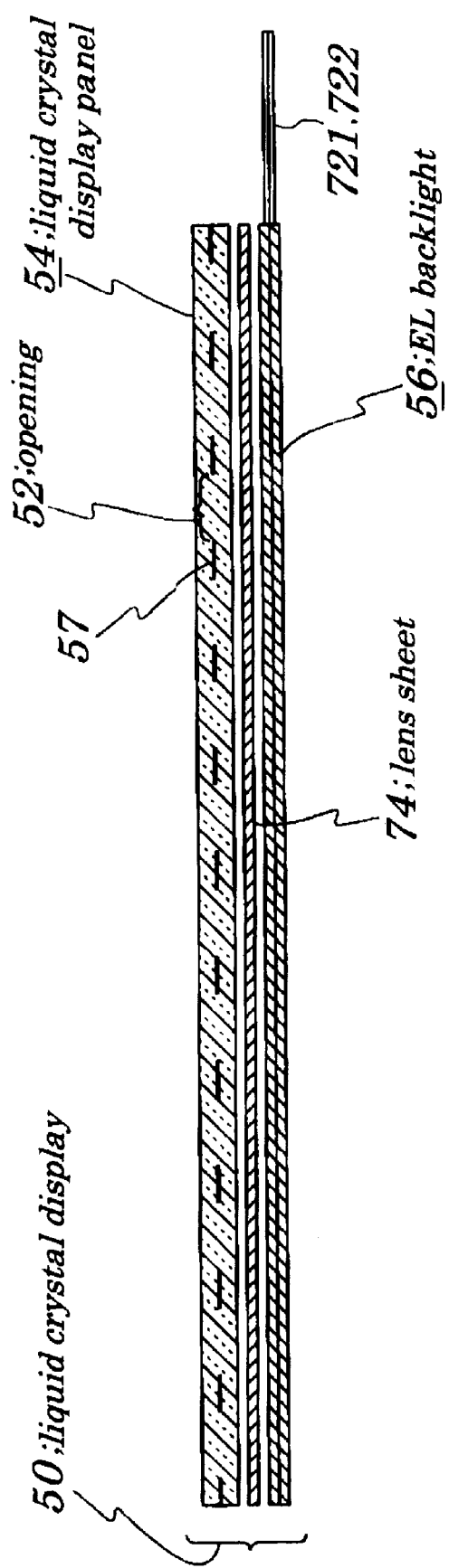
FIG. 7 is a whole sectional view showing a conventional liquid crystal display.
Figure 8:
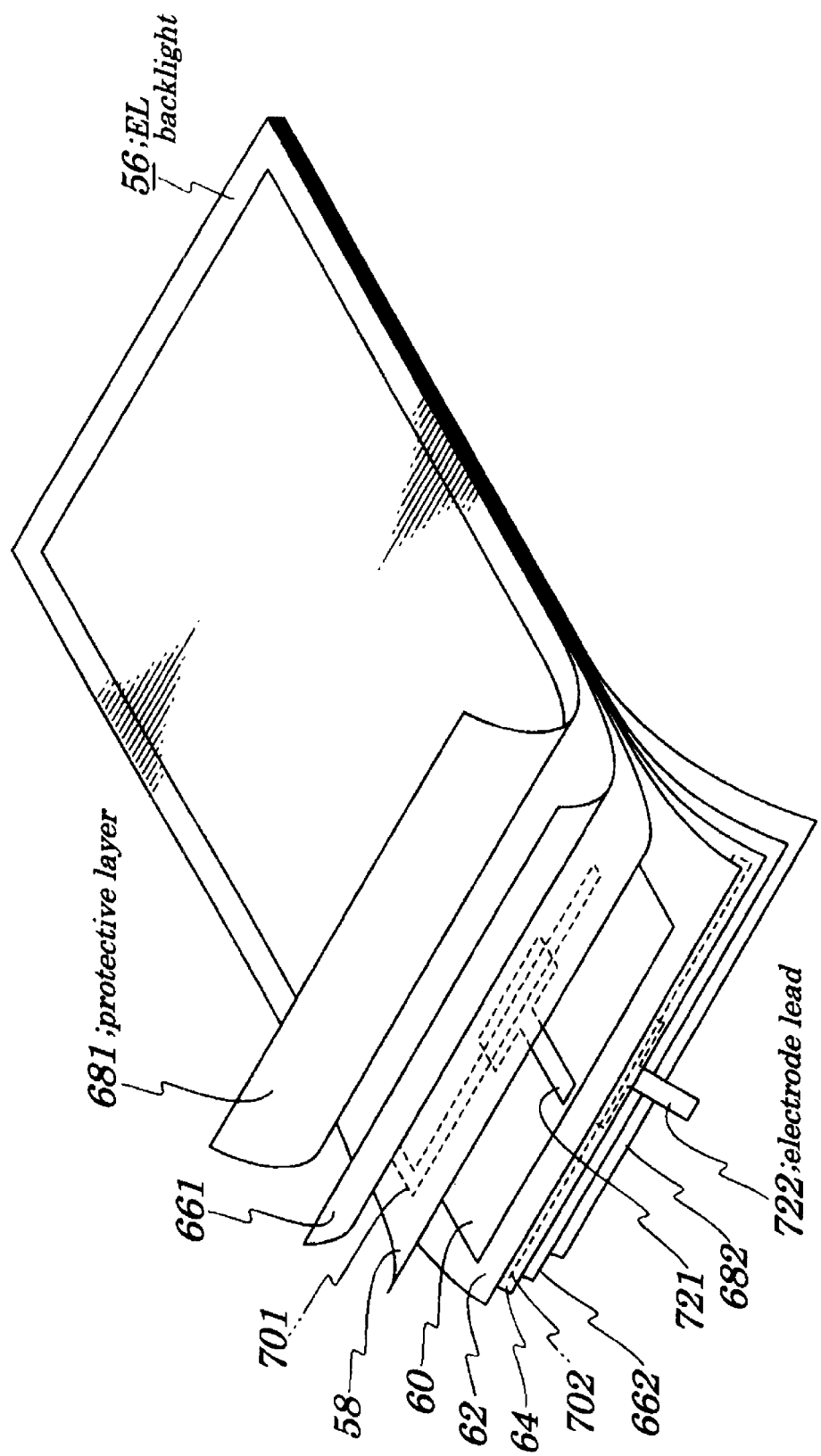
FIG. 8 is an assembly perspective view showing an EL backlight of the liquid crystal display shown in FIG. 7.

FIG. 1 is a whole sectional view showing a liquid crystal display of the embodiment of the present invention, and FIG. 2 is a partial enlarged view thereof. Explanations will be given with reference to drawings, however, the same numerals are applied to parts equal to those in FIG. 7 and FIG. 8 and explanations of those will be omitted.

As shown in FIG. 1, a liquid crystal display 10 of this embodiment includes a liquid crystal display panel 54 provided with multiple openings 52 allowing adjustable a light transference quantity and an EL backlight 12 being an approximate size of the liquid crystal display panel 54 and irradiating the liquid crystal display panel 54 from back of the panel 54. Concave luminous parts 14 corresponding to the respective openings 52 are formed in a luminous layer 16 of an EL backlight 12.

As shown in FIG. 2, each concave luminous part 14 is formed for each opening 52, and is positioned so as to coincide with a center 520 of the opening 52 with a center 140 of the concave luminous part 14. The concave luminous part 14 has a hemispherical surface. A surface of a protective layer 18 is flat at the side of the liquid crystal display panel 54 and the concave luminous part 14 is filled up with the protective layer 18.

In drawings except for FIG. 2, only the luminous layer 16 and the protective layer 18 are shown concerning the EL backlight 12 as a matter of convenience. Additionally, sizes of the opening 52 and the concave luminous part 14 are vastly smaller than the liquid crystal display 10 in fact.

Next, an explanation will be given of manufacturing processes of the liquid crystal display 10.

First, a surface electrode 58, the luminous layer 16, an insulating layer 62 and an rear face electrode 64 are laminated and then are put between a moisture-proof film 661 and a moisture-proof film 662. A protective layer 682 is laminated on the moisture-proof film 662.

Subsequently, this lamination (including the surface electrode 58, the luminous layer 16, the insulating layer 62, the rear face electrode 64, the moisture-proof film 661 and the moisture-proof, 662 and the protective layer 682) is molded by a press or a like to form the concave luminous part 14.

Finally, the protective layer 18 (FIG. 1) is molded by injection molding, press or a like.

Next, an explanation will be given of operations in the liquid crystal display 10.

Figure 3A:
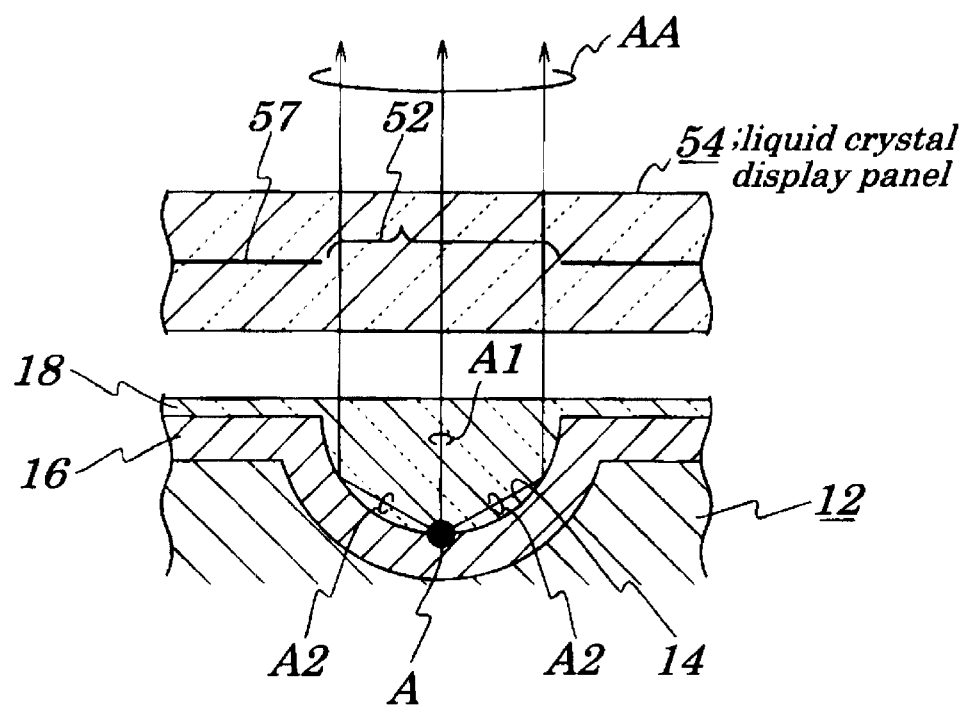
FIG. 3A is a view showing a first example of an optical path.

Light generated from the concave luminous part 14 is repeatedly reflected by an inner wall thereof and then exits along a central axis 14c of the concave luminous part 14 (refer to FIGS. 2, 3A). The opening 52 corresponding to the concave luminous part 14 is positioned in the direction of the central axis 14c. As a result, the light generated in the concave luminous part 14 has a strong directivity to the opening 52 corresponding to the concave luminous part 14. That is to say, the EL backlight 12 operates equally to a condensing unit such as a lens sheet 74 (shown in FIG. 7). Moreover, an area of the luminous layer 16 for one opening 52 is larger than that of a flat luminous layer, therefore, luminance improves.

FIG. 3A shows a typical optical path of a light generated at a point A in the vicinity of the center of the concave luminous part 14 with arrows. The non-directional light generated from the point A is divided into a ray A1 going to the liquid crystal display panel and rays A2 going to the inner wall of the concave luminous part 14. The ray A1 directly enters the opening 52. The rays A2 are reflected by the inter wall of the concave luminous part 14 (to be accurate, the rear face electrode 64) and then are also introduced to the opening 52. As above described, the most of the light generated at the point A becomes transparent light AA through the opening 52.

Figure 3B:
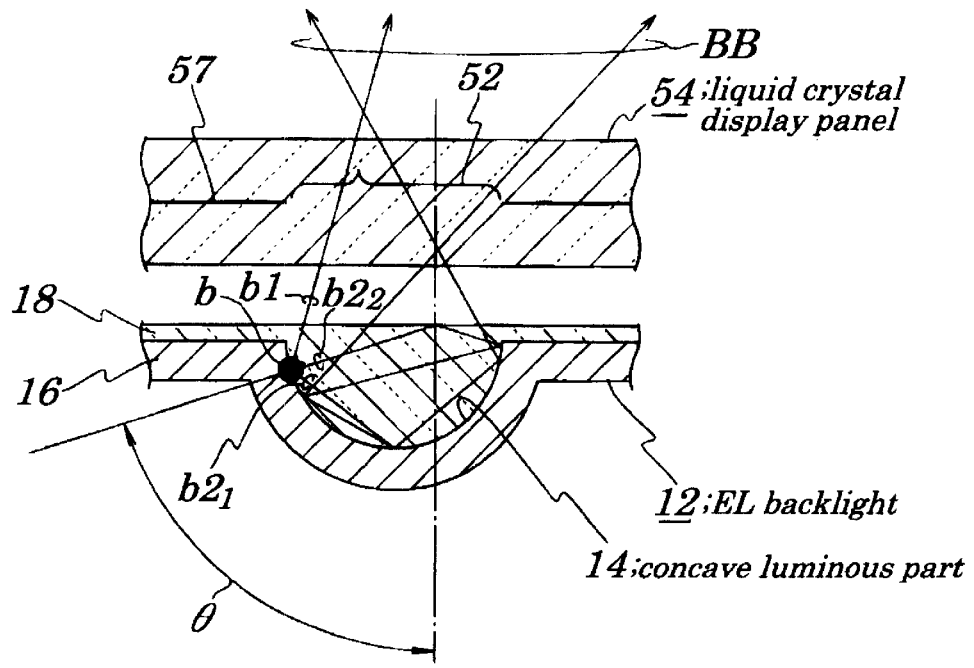
FIG. 3B is a view showing a second example of an optical path and FIG. 3C is a view showing a third example of an optical path.

FIG. 3B shows a typical optical path of a light generated at a point b in the vicinity of the edge of the concave luminous part 14 with arrows. The non-directional light generated from the points b is divided into a ray b1 going to the liquid crystal display panel 54 and a ray $b2_1$ and a ray $b2_2$ going to the inner wall of the concave luminous part 14. The ray b1 directly enters the opening 52. The ray b21 is reflected by the inter wall of the concave luminous part 14 (to be accurate, the rear face electrode 64) and then is also introduced to the opening 52. As to the light ray $b2_2$, an angle of incidence θ into the surface of the protective layer 18 is larger than a critical angle $θ_0$ (solid-state value). In this case, the ray $b2_2$ is also all reflected by the surface of the protective layer 18 and is also returned to the inter wall of the concave luminous part 14, therefore, the ray $b2_2$ is introduced to the opening 52. As above described, the most of the light generated at the point b becomes transparent light BB through the opening 52.

Figure 3C:
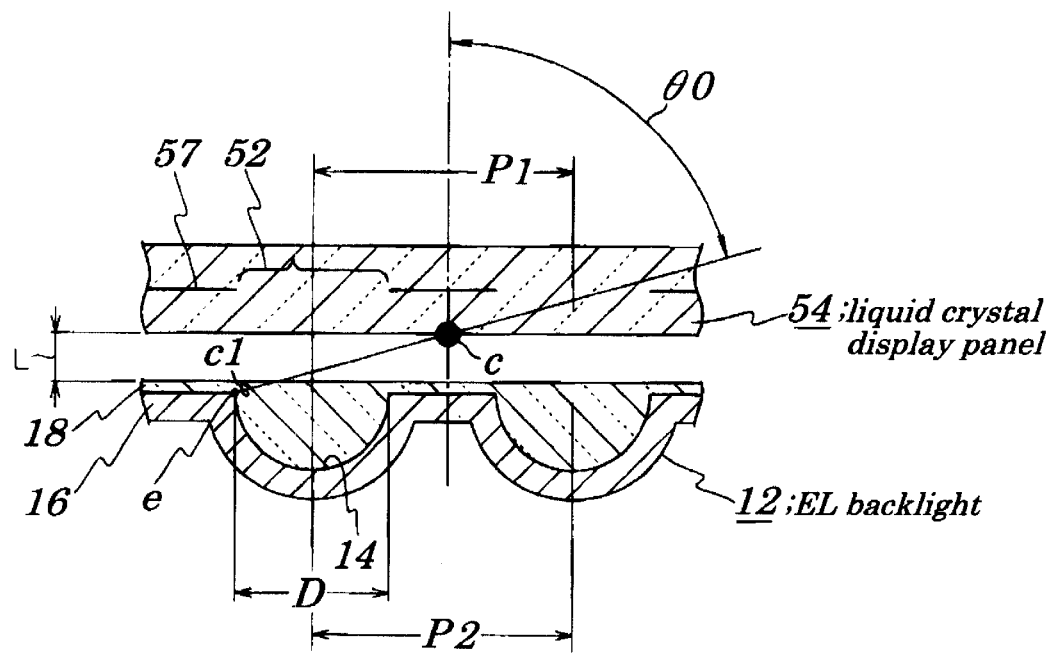

FIG. 3C shows a case in that a distance between the liquid crystal display panel 54 and the EL backlight 12 is set to L, a pitch of the openings 52 is set to P1, a pitch of the luminous parts 14 is set to P2 (=P1) and a size of the concave luminous part 14 is set to D.

Here, when a ray c1 generated at a peripheral edge e of the concave luminous part 14 is incident into the surface of the protective layer 18 at a critical angle $θ_0°$, a point c at which an elongation line of the light-ray c1 and the liquid crystal display cross is preferably near a midpoint of the opening 52 and an adjacent opening 52.

In this case, a distance between the peripheral edge e and the point c is D+(P2−D)/2, therefore, the following expression is carried out;

$$L (D+(P2−D)/2) \times \tan(90°−θ_0)$$

When the point c is at center between two openings 52, a light quantity shielded by the non-opening 57 increases. In addition, no attention is paid to incident rays to the surface of the protective layer 18 over the critical angle $θ_0$ among the light generated at the peripheral edge e of the concave 14, since these rays attenuate exceedingly.

Figure 4A:
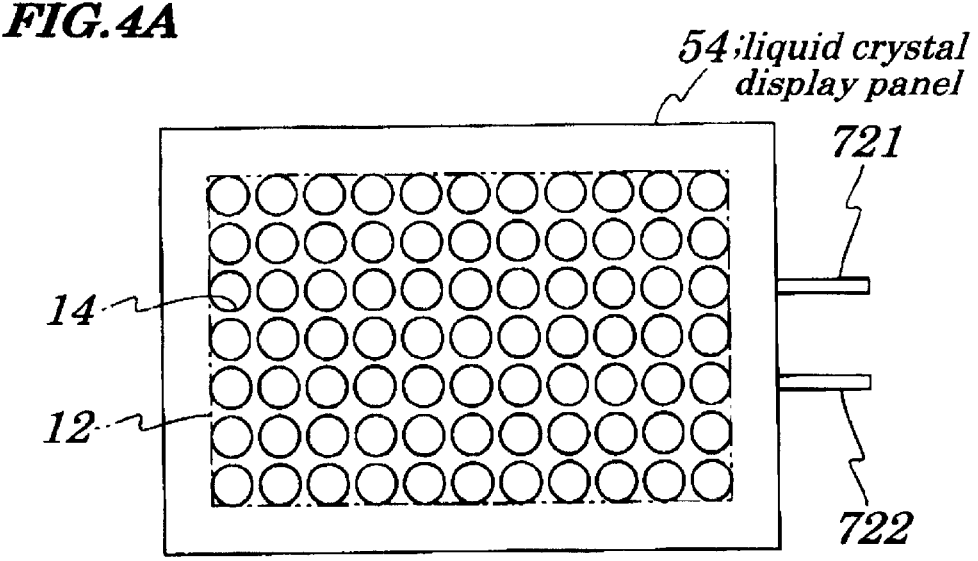
FIG. 4A is an enlarged view showing a first example of an array pattern of a concave luminous part in the liquid crystal display according to the present invention.
Figure 4B:
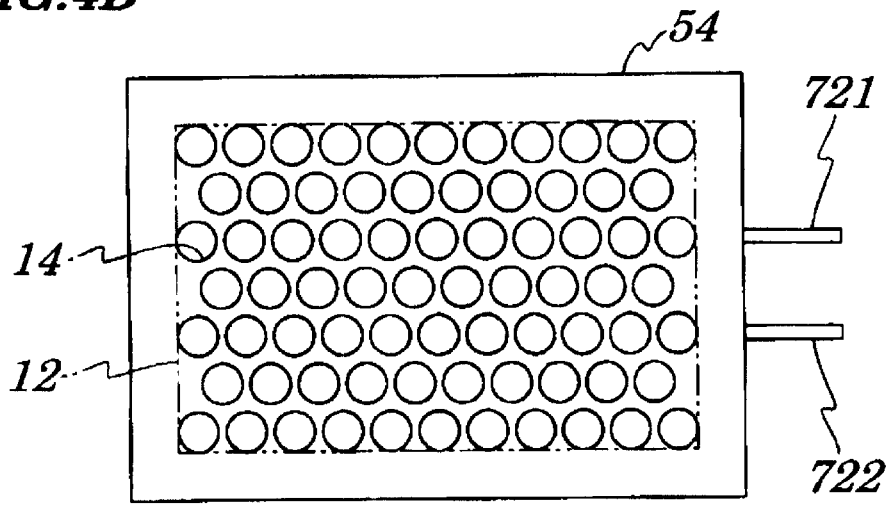
FIG. 4B is a second example.
Figure 4C:
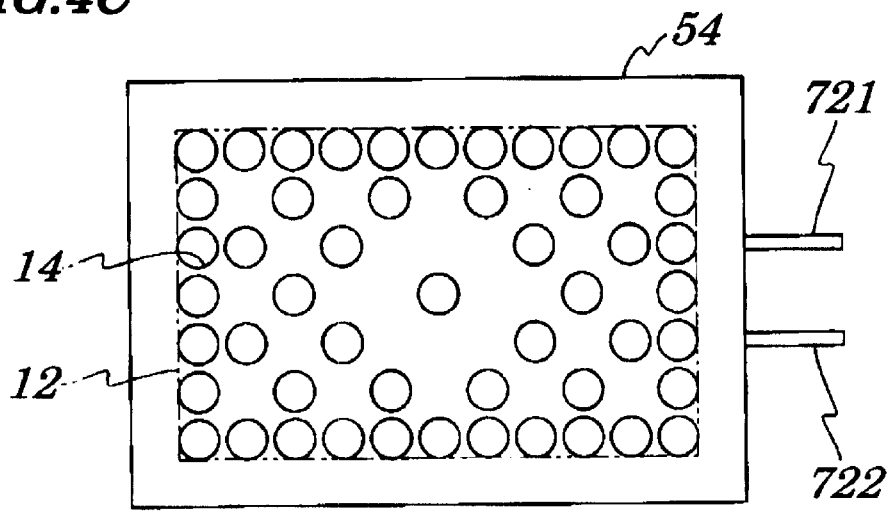
FIG. 4C is a third example.

FIGS. 4A, 4B and 4C are enlarged views showing array patterns of the concave luminous parts 14 in the liquid crystal display according to this embodiment. Incidentally, the same numerals are applied to parts similar to those shown in FIG. 1 and explanations thereof are omitted.

FIG. 4A is a first example of the array pattern. The concave luminous parts 14 are arranged like a grid.

FIG. 4B is a second example of the array pattern. The concave luminous parts 14 are arranged like a hound's check. In this array pattern, it is possible to arrange the concave luminous parts 14 in the highest-density.

FIG. 4C is a third example of the array pattern. The concave luminous parts 14 are arranged in the lower-density as near the center and in the higher-density as near the periphery, therefore, it is possible to unify the luminance of the EL backlight 12 overall.

Figure 4D:
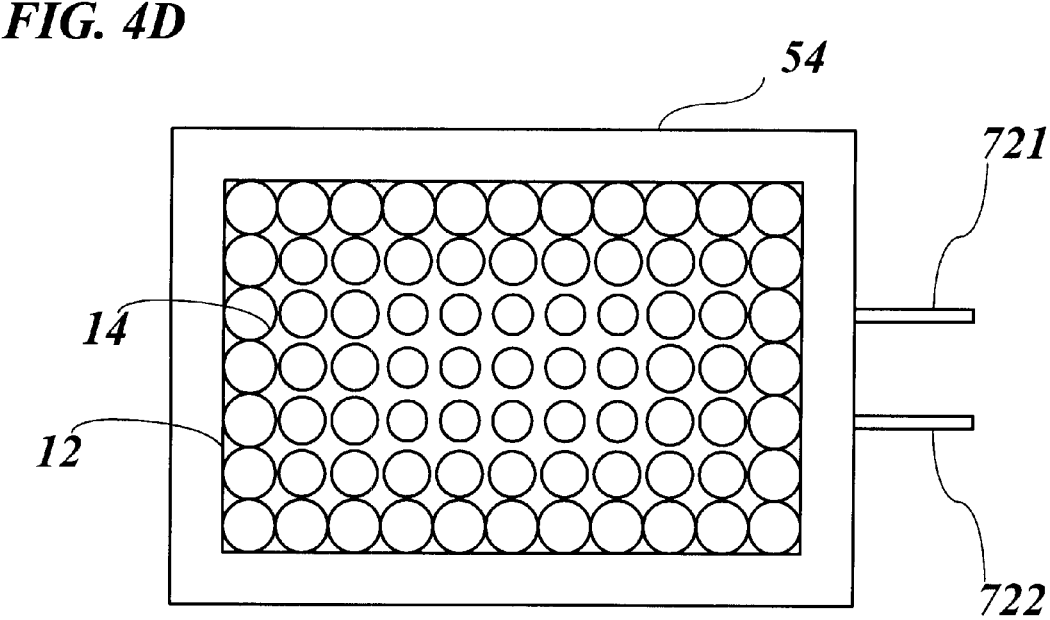
FIG. 4D is a fourth example.

FIG. 4D is a fourth example of the array pattern. The concave luminous parts 14 are larger as the concave luminous parts come near a periphery of the EL backlight and are smaller as the concave luminous parts come near a center of the EL backlight. Thus in the illustrated embodiment the concave luminous parts are larger as luminance becomes lower near the edges of the EL backlight and smaller as luminance becomes higher toward the center of the EL backlight.

FIGS. 5A, 5B, 6A and 6B are sectional views showing various sectional forms of concave luminous parts in the liquid crystal display according to this embodiment. Explanations will be given with reference to FIGS. 5A, 5B, 6A and 6B. Incidentally, the same numerals are applied to parts similar to those shown in FIG. 1 and explanations thereof are omitted.

Figure 5A:
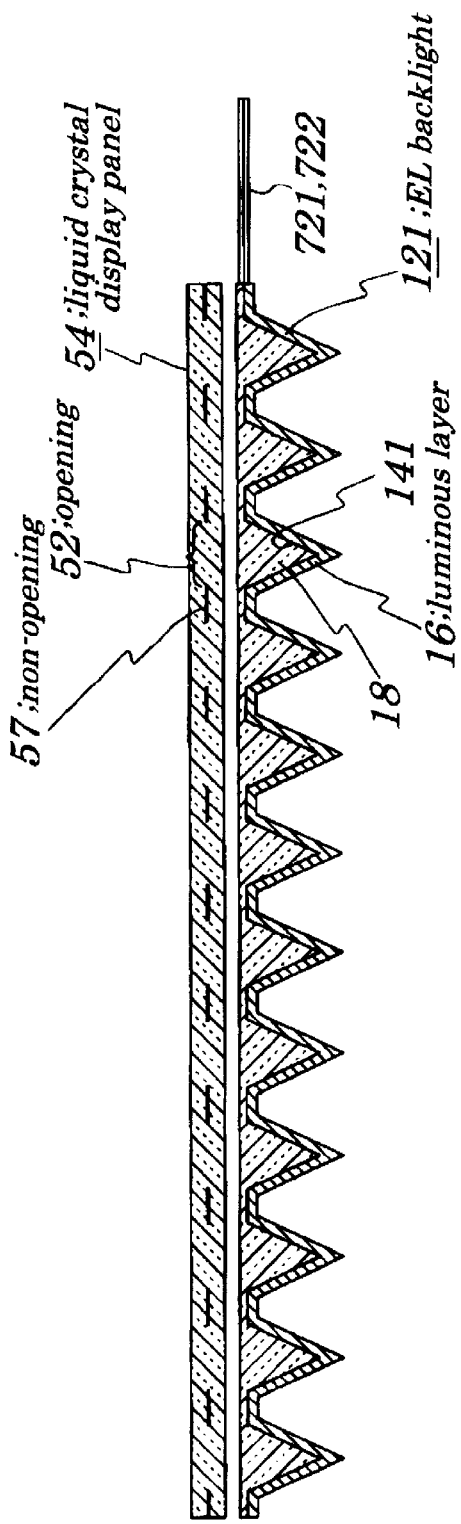
FIG. 5A is a sectional view showing a first example of a section structure of the concave luminous part in the liquid crystal display according to the present invention and FIG. 5B is a second example.

FIG. 5A shows that a concave luminous part 141 of an EL backlight 121 is a cone-face or a pyramid-face.

Figure 5B:
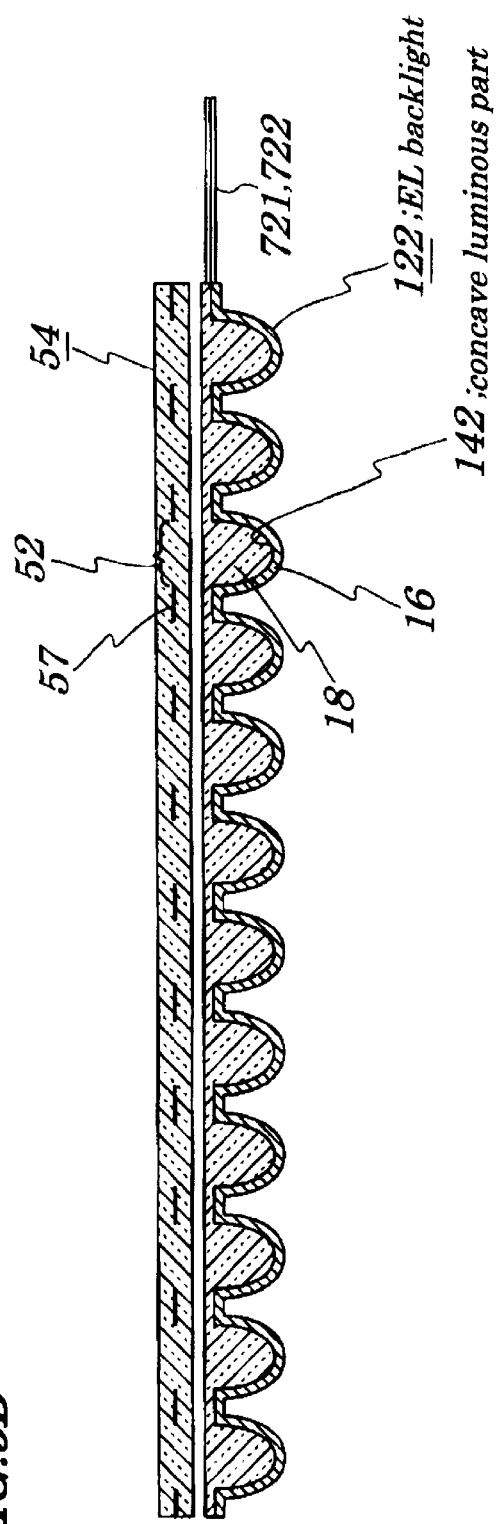

FIG. 5B shows that a concave luminous part 142 of an EL backlight 122 is a semi-ellipse-face.

Figure 6A:
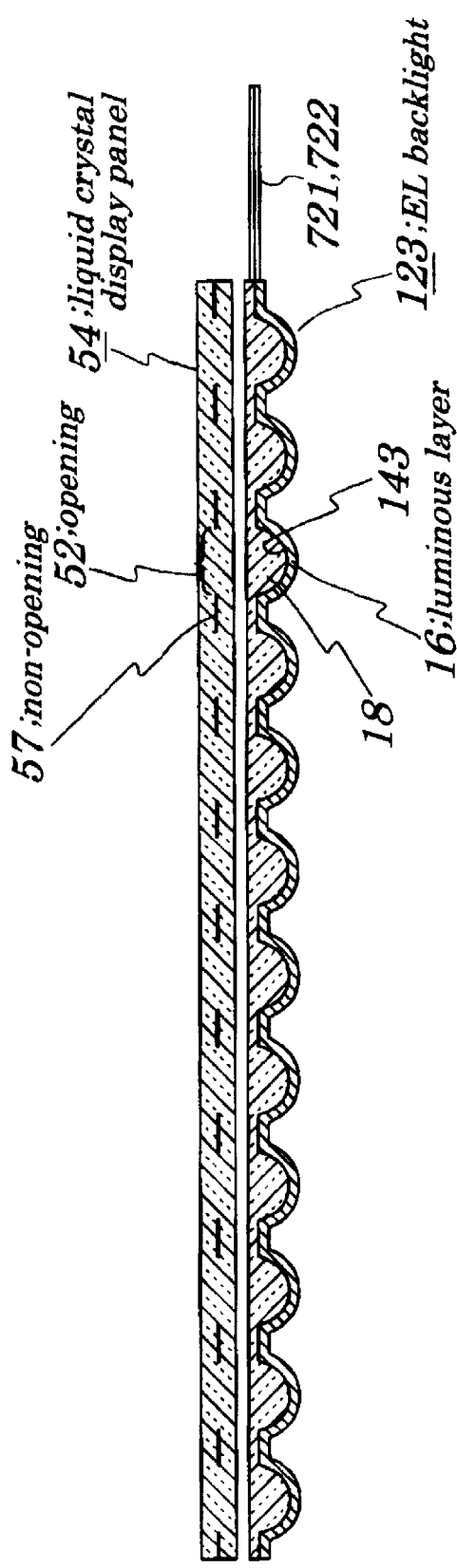
FIG. 6A is a sectional view showing a third example of a section structure of the concave luminous part in the liquid crystal display according to the present invention and FIG. 6B is a fourth example.

FIG. 6A shows that a concave luminous part 143 of an EL backlight 123 is a semi-parabola-face.

Figure 6B:
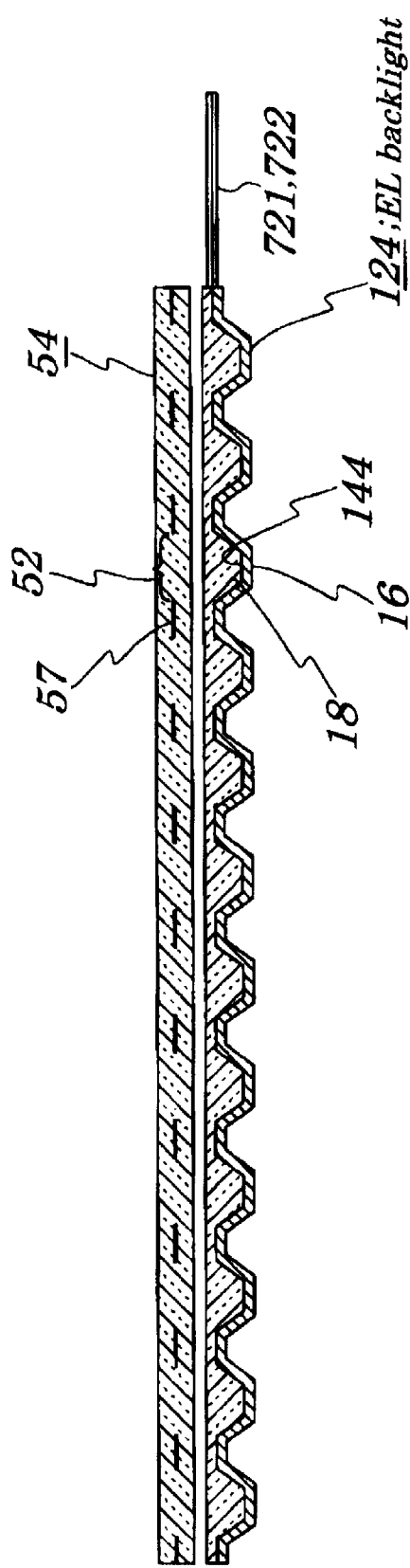

FIG. 6B shows that a concave luminous part 144 of an EL backlight 124 is a cone-frustum-face or a pyramid-frustum-face.

According to a liquid crystal display of the present invention, each concave luminous part is formed on an EL backlight in correspondence with each opening in a liquid crystal display panel, therefore, it is possible to condense light-rays generated in the concave luminous part toward the opening. As a result, since a condensing unit such as a lens sheet is not required to use light from the backlight effectively, it is possible to achieve to reduce thickness, weight parts and a like of the liquid crystal display. In addition, since an area of a luminous layer for one opening is larger than that of a flat layer, it is possible to improve luminance per unit-display-area.

It is thus apparent that the present invention is not limited to the above embodiments but may be changed and modified without departing from the scope and spirit of the invention.

Finally, the present application claims the priority based on Japanese Patent Application No. Hei1-177809 filed on Jul. 24, 1999, which is herein incorporated by reference.

What is claimed is:

1. A liquid crystal display comprising:
    a liquid crystal display panel provided with multiple openings providing adjustable light transference quantities; and
    an EL backlight being an approximate size of said liquid crystal display panel and irradiating said liquid crystal display panel from a back of said liquid crystal display panel, the EL backlight comprising a luminous layer that is shaped so as to have concave parts corresponding to respective openings of said liquid crystal display for directing light toward said respective openings.

2. The liquid crystal display according to claim 1, wherein a center of each of said concave luminous parts coincides with a center of a corresponding opening of said liquid crystal display panel when said liquid crystal display panel is viewed from its front.

3. The liquid crystal display according to claim 2, wherein a protective layer with a flat surface is filled in said concave luminous parts, and when a distance between said liquid crystal display panel and said EL backlight is defined as L, a pitch of said openings is defined as P1, a pitch of said concave luminous parts is defined as P2, a size of one of said concave luminous parts is defined as D and a critical angle to said protective layer is defined as $θ_0$, a formula (P1=P2 and L □ (D+(P2−D/2)×tan(90°−$θ_0$)) is expressed.

4. The liquid crystal display according to claim 1, wherein said concave luminous parts are formed in a higher-density as a luminance becomes lower and are formed in a lower-density as said luminance becomes higher in said luminous layer of said EL backlight.

5. The liquid crystal display according to claim 1, wherein said concave luminous parts are formed in a higher-density as said concave luminous parts come near a periphery of said EL backlight and are formed in a lower-density as said concave luminous parts come near a center of said EL backlight in said luminous layer of said EL backlight.

6. The liquid crystal display according to claim 1, wherein said concave luminous parts are larger as a luminance becomes lower and are smaller as said luminance becomes higher in said luminous layer of said EL backlight.

7. The liquid crystal display according to claim 1, wherein said concave luminous parts are larger as said concave luminous parts come near a periphery of said EL backlight and are smaller as said concave luminous parts come near a center of said EL backlight in said luminous layer of said EL backlight.

8. The liquid crystal display according to claim 1, wherein said concave luminous parts are formed in a high-density or a low-destiny at a predetermined range in said luminous layer of said EL backlight.

9. A liquid crystal display according to claim 1, wherein said concave luminous parts are small or large at a predetermined range in said luminous layer of said El backlight.

10. The liquid crystal display according to claim 3, wherein said concave luminous parts are formed in a higher-density as a luminance becomes lower and are formed in a lower-density as said luminance becomes higher in said luminous layer of said EL backlight.

11. The liquid crystal display according to claim 3, wherein said concave luminous parts are formed in a higher-density as said concave luminous parts come near a periphery of said EL backlight and are formed in a lower-density as said concave luminous parts come near a center of said EL backlight in said luminous layer of said EL backlight.

12. The liquid crystal display according to claim 3, wherein said concave luminous parts are larger as a luminance becomes lower and are smaller as said luminance becomes higher in said luminous layer of said EL backlight.

13. The liquid crystal display according to claim 3, wherein said concave luminous parts are larger as said concave luminous parts come near a periphery of said EL backlight and are smaller as said concave luminous parts come near a center of said EL backlight in said luminous layer of said EL backlight.

14. The liquid crystal display according to claim 3, wherein said concave luminous parts are formed in a high-density or a low-destiny at a predetermined range in said luminous layer of said EL backlight.

15. A liquid crystal display according to claim 3, wherein said concave luminous parts are small or large at a predetermined range in said luminous layer of said El backlight.

* * * * *